(12) United States Patent
Kloepfer

(10) Patent No.: US 6,565,109 B1
(45) Date of Patent: May 20, 2003

(54) KINGPIN ASSEMBLIES FOR LIGHTWEIGHT TRAILERS

(76) Inventor: Michael Kloepfer, R.R. #1, Delhi Ontario (CA), N4B 2W4

( * ) Notice: Subject to any disclaimer, the term of this patent is extended or adjusted under 35 U.S.C. 154(b) by 0 days.

(21) Appl. No.: 10/017,818

(22) Filed: Dec. 14, 2001

(51) Int. Cl.$^7$ ................................................ B62D 53/08
(52) U.S. Cl. ...................................... 280/433; 280/496
(58) Field of Search ................................. 280/433, 434, 280/438.1, 496, 495, 407, 491.5

(56) References Cited

U.S. PATENT DOCUMENTS

| | | | |
|---|---|---|---|
| 2,915,320 A | * 12/1959 | Jewell et al. | |
| 3,252,715 A | * 5/1966 | Chieger et al. | |
| 3,600,005 A | * 8/1971 | Glaza | 280/433 |
| 3,633,941 A | * 1/1972 | Pleier | 280/440 |
| 3,771,816 A | * 11/1973 | Hord, Jr. | 280/433 |
| 3,811,708 A | * 5/1974 | Baaso | 280/433 |
| 3,990,720 A | * 11/1976 | Schwartz | 280/433 |
| 4,969,960 A | * 11/1990 | Smith | 298/17 R |
| 6,036,428 A | * 3/2000 | Kooima | 414/563 |
| 6,073,952 A | * 6/2000 | Schulz | 280/433 |

* cited by examiner

*Primary Examiner*—Avraham Lerner
(74) *Attorney, Agent, or Firm*—Delbert J. Barnard

(57) ABSTRACT

A kingpin assembly includes an aluminum frame member (16) formed of two identical extrusions. Each extrusion includes a box beam (18, 20) having a top (40) three vertical walls (42, 44, 46) and a bottom (47) including forward and rearward flanges. The forward extrusion includes a box beam (18), a rearward bottom flange (28) and a forward bottom flange (30). The rearward extrusion includes a box beam (20) a rearward bottom flange (24) and a forward bottom flange (26). Each box beam extrusion is positioned end-for-end from the other box beam extrusion. A steel kingpin (KP) is connected to an aluminum kingpin mounting block (36) which is positioned at the center of the frame member (16) between the box beams (18, 20). The box beam extrusions are welded together by a single transverse weld (W). The forward bottom flange (30) on the forward extrusion is connected to a forward panel (60) by a single longitudinal weld (W). The aluminum kingpin mounting block (36) is flanked by a pair of longitudinal channel beams (32, 34) which at their ends are connected to the box beams (18, 20).

20 Claims, 9 Drawing Sheets

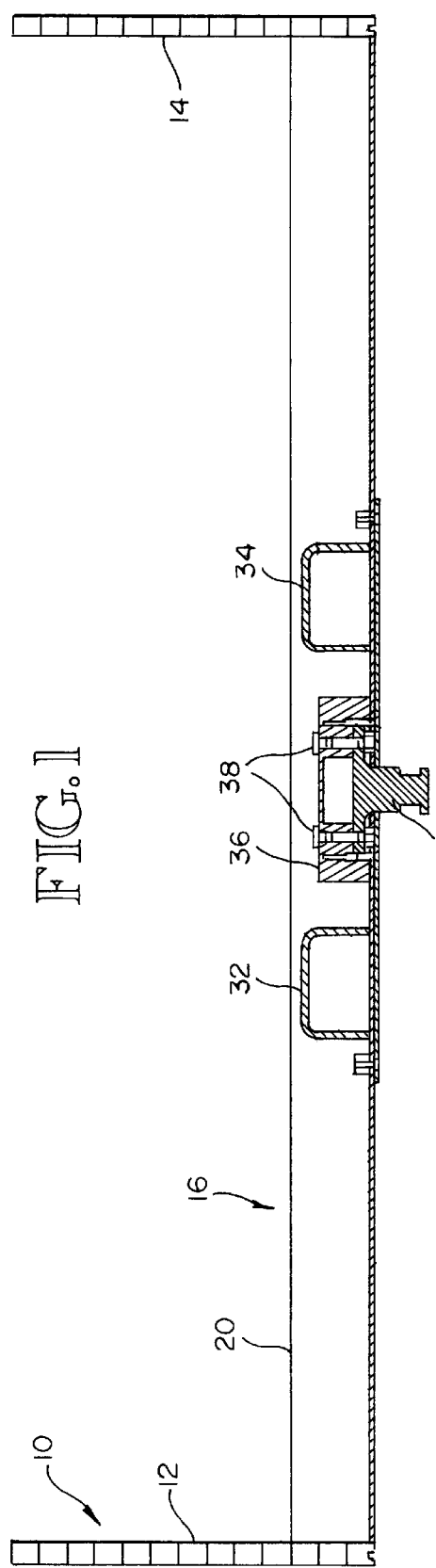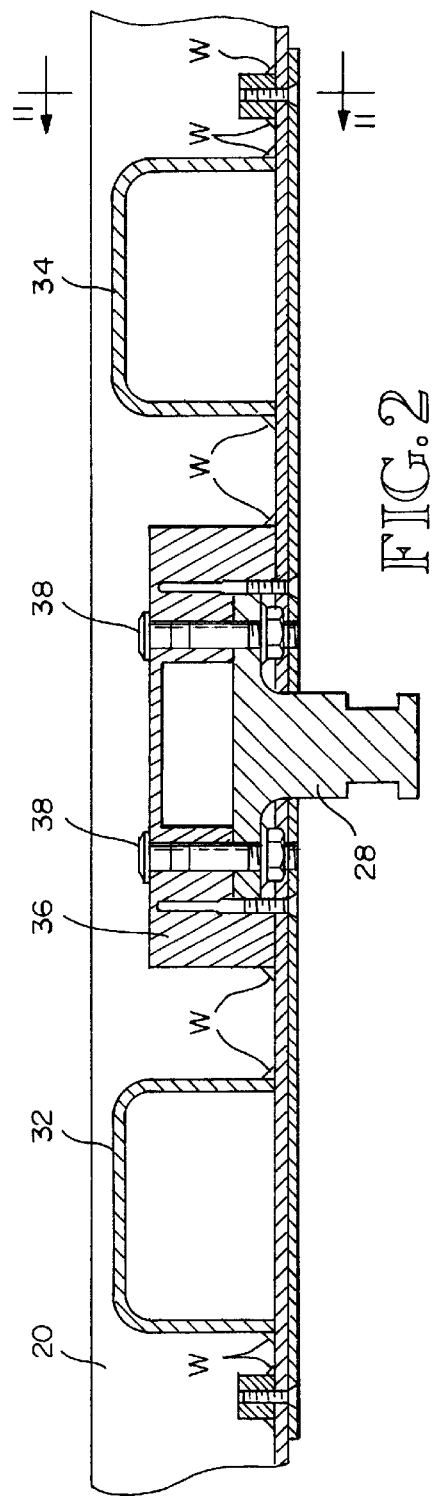

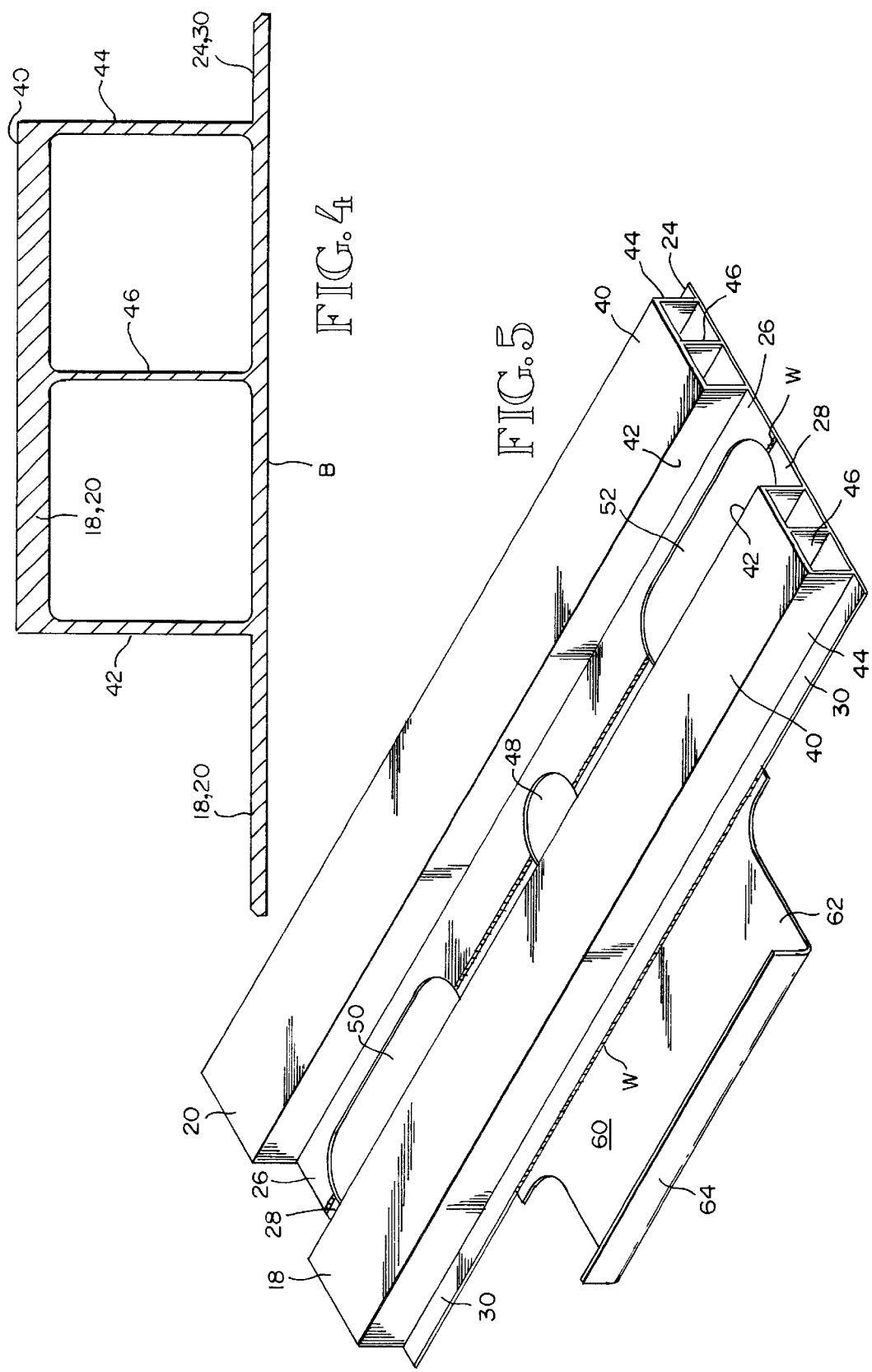

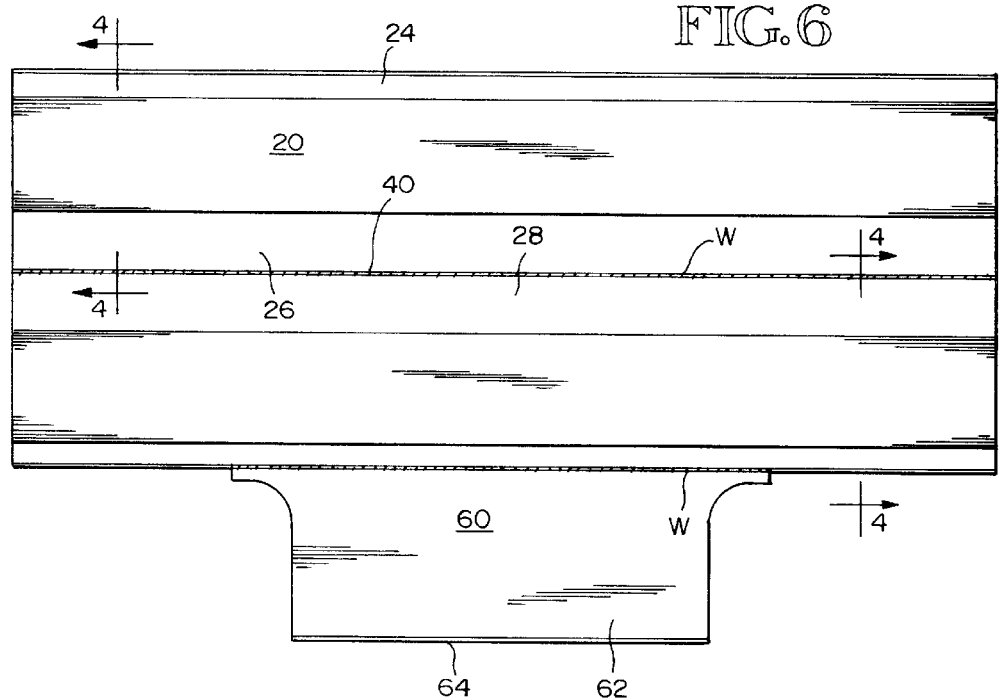
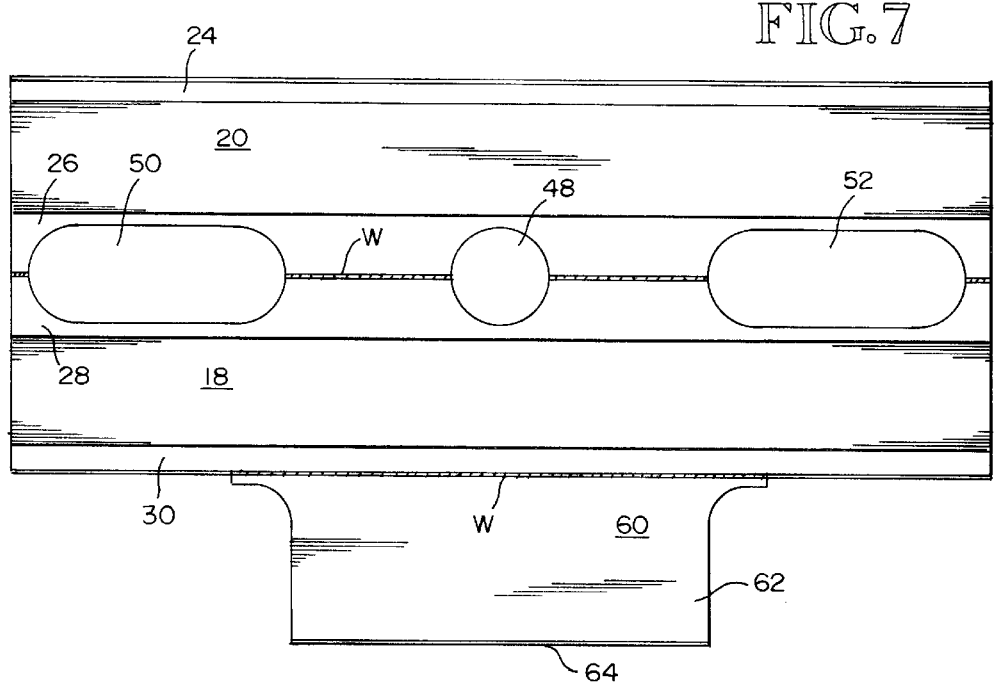

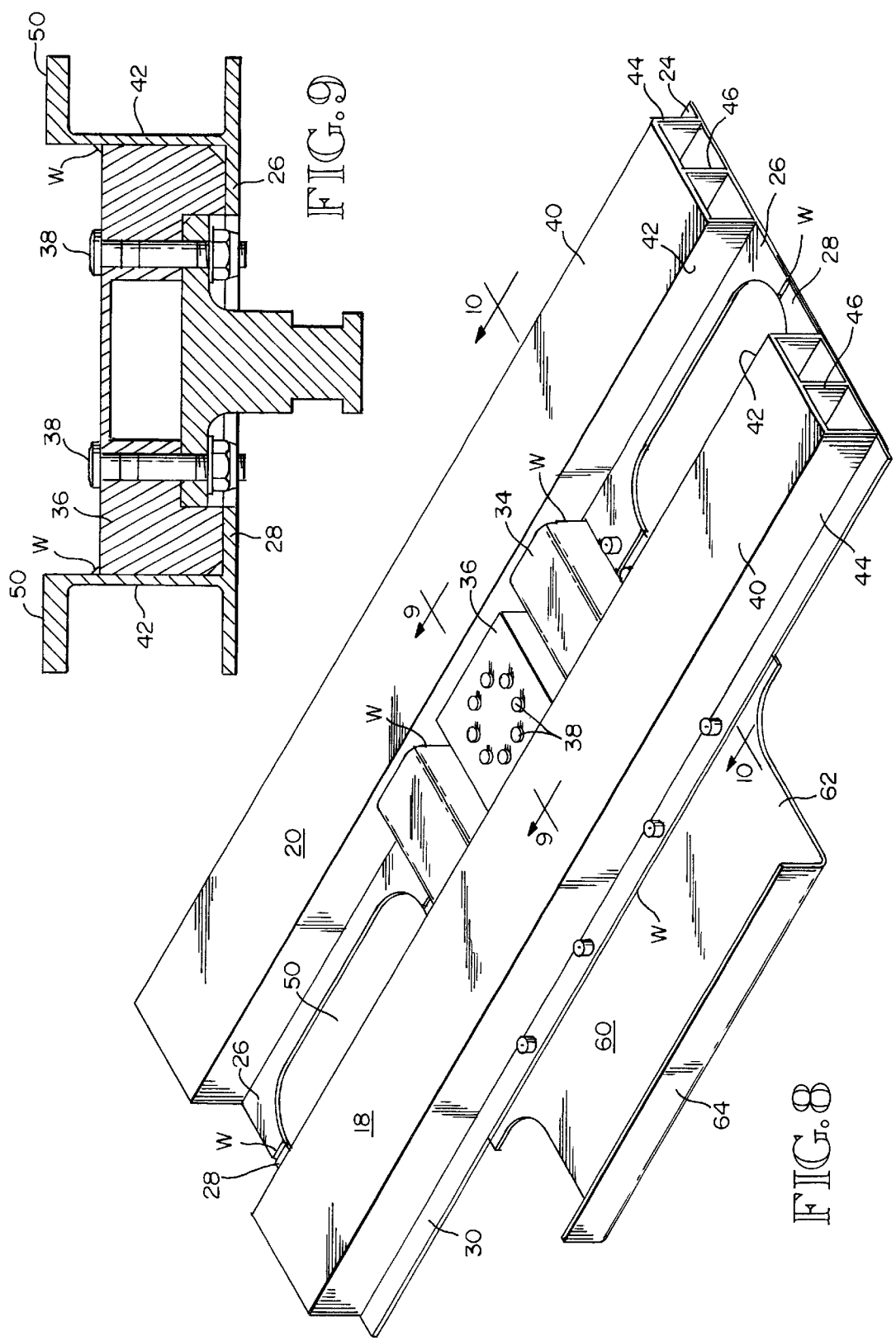

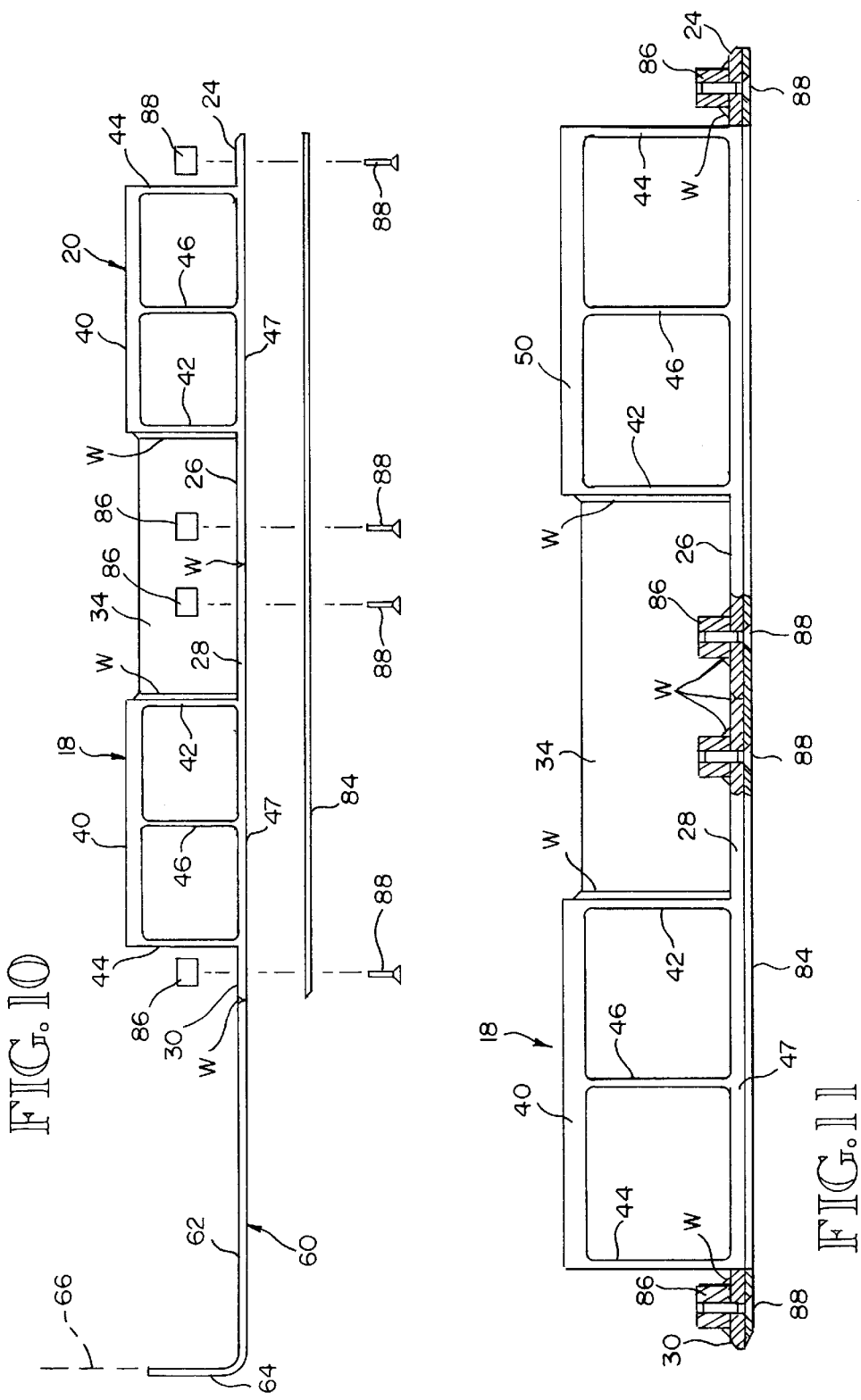

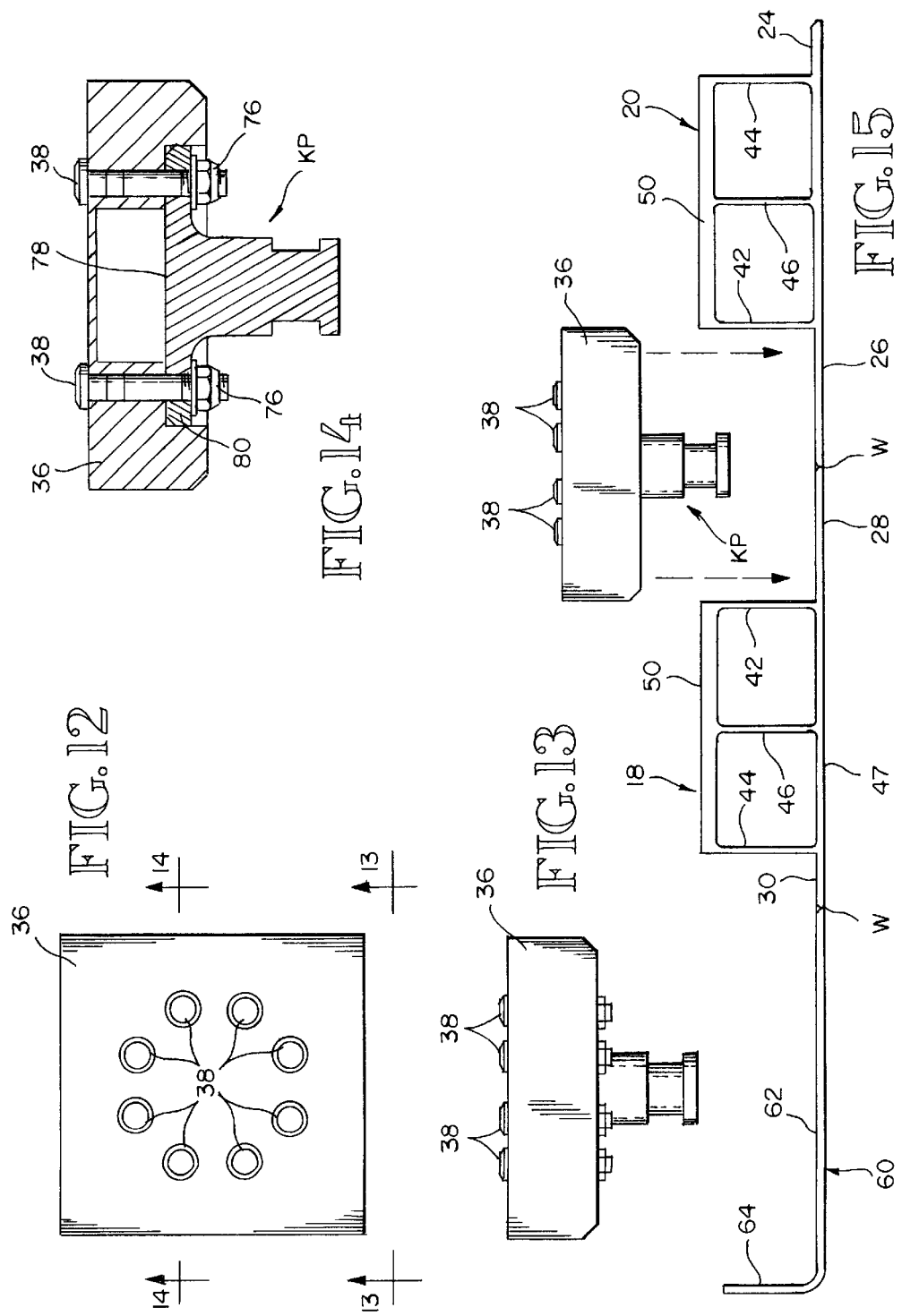

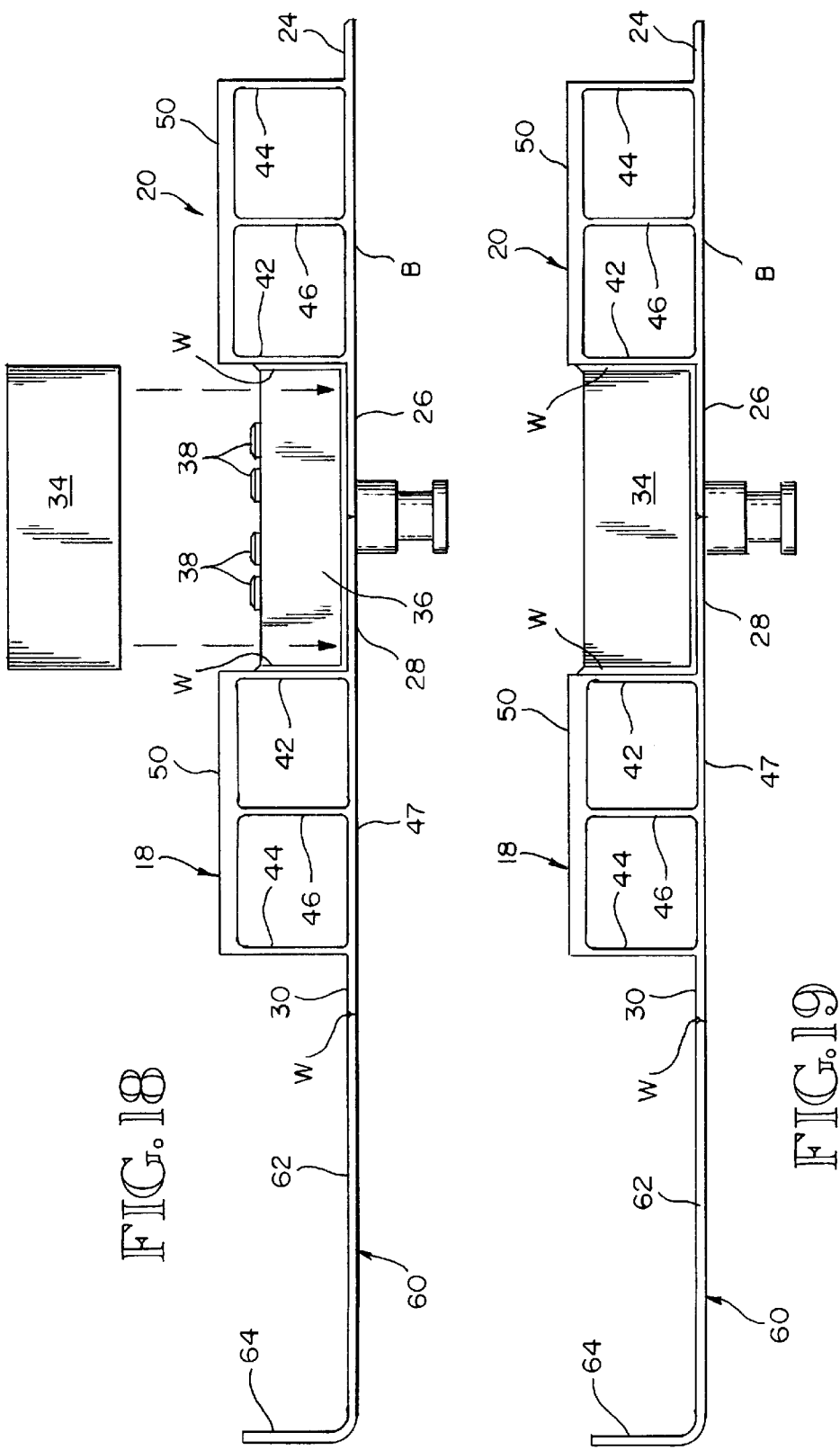

KINGPIN ASSEMBLIES FOR LIGHTWEIGHT TRAILERS

TECHNICAL FIELD

This invention relates to lightweight trailers. More particularly, it relates to kingpin assemblies for lightweight trailers. Herein, "lightweight trailers" includes aluminum alloy trailers, magnesium alloy trailers and other trailers that are primarily made from a material that is lighter in weight than steel and steel based alloys.

BACKGROUND OF THE INVENTION

It is known to provide lightweight trailers with steel kingpins. For example, U.S. Pat. No. 3,600,005, granted Aug. 17, 1971, to Gordon K. Glaza, and assigned to The Dow Chemical Co., discloses a steel kingpin mounted in a support frame that is a part of the under frame of a trailer. The support frame is constructed from a lightweight metal such as an aluminum or magnesium alloy. The kingpin has an inner end portion that extends through an opening in the support frame and includes a threaded upper end that threads into a threaded opening in a cap. When the kingpin and the cap are connected together a flange that is intermediate the length of the kingpin presses against a lower portion of the under frame and the cap presses against an upper portion of the under frame.

Canadian Patent No. 1,260,037, granted Sep. 26, 1989, to Donald B. Stinson, and assigned to the Fruehauf Corporation, discloses a second way of constructing a lightweight undercarriage frame and a second way of connecting a steel kingpin to the undercarriage frame.

There is a need to provide a kingpin assembly for lightweight trailers, e.g. aluminum alloy trailers, that has a minimum of welds so that the amount of heat that is transferred into the assembly is reduced. This is important because when an aluminum alloy is welded, it loses a portion of its original properties. A principal object of this invention is to fill this need.

BRIEF SUMMARY OF THE INVENTION

A principal object of the present invention is to provide an improved kingpin assembly which is lightweight, but strong and durable, is easily maintained, and which can be used universally in several aluminum alloy trailer configurations. The number of welds are reduced by making the undercarriage frame from extrusions of a unique design which requires a minimum of welds and which place the welds in a low stress area of the kingpin assembly.

The present invention includes providing an aluminum frame member that includes a bottom and a kingpin receiving opening in the bottom. An aluminum kingpin mounting block is provided that includes a downwardly opening socket surrounded by a base. A steel kingpin is provided that has a kingpin head that is positioned within the socket and a kingpin shaft that depends from the kingpin head and downwardly from the socket. A plurality of fasteners detachably connect the kingpin head to the aluminum kingpin mounting block when the kingpin head is within the socket. The kingpin shaft extends downwardly from the kingpin head and through the kingpin opening in the bottom of the aluminum frame member. The kingpin shaft projects downwardly from and below the aluminum frame member. The aluminum kingpin mounting block is welded to the aluminum frame member, for securing the aluminum mounting block and the steel kingpin to the aluminum frame member. The aluminum frame member comprises a pair of longitudinally spaced apart transverse box beams that extend upwardly from the bottom of the aluminum frame member. The kingpin opening in the bottom is located between the transverse box beams. The aluminum mounting block is welded to the transverse box beams.

The aluminum frame member comprises two extrusions that are welded together to form the aluminum frame member. Each extrusion comprises a portion of the bottom of the aluminum frame member and a different one of the transverse box beams. The portions of the extrusions which provide the bottom of the aluminum frame member are welded together between the transverse box beams.

In preferred form, each box beam is composed of at least three, horizontally spaced apart, vertical webs with lower edges that are attached to the bottom of the aluminum frame member. The vertical webs also have upper edges and the box beam includes a top web that is connected to and interconnects the top edges of the vertical webs.

According to another aspect of the invention, a pair of longitudinal, aluminum frame beams are interconnected between the two transverse box beams, on opposite sides of the aluminum mounting block. The longitudinal frame beams are connected to the bottom of the aluminum frame member and at their ends are welded to the transverse box beams.

In preferred form, the aluminum kingpin mounting block and the kingpin head are provided with complementary, circular arrays of fastener openings, and the fasteners extend through these openings. Also, in preferred form, the fasteners are studs that are press fit into the openings in the mounting block. The studs have threaded lower end portions that project downwardly from the aluminum kingpin mounting block and through the openings in the kingpin head. The fasteners further include nuts that are threaded onto the threaded lower ends of the studs.

The present invention also includes providing the kingpin assembly with a stainless steel plate that is positioned between the aluminum kingpin mounting block and the head of the steel kingpin.

Another aspect of the present invention is the provision of a replaceable, stainless steel wear plate below the bottom of the aluminum frame members. Preferably, screw fasteners are used for securing the stainless steel wear plate to the aluminum frame member. Some of the screw fasteners may screw into the aluminum kingpin mounting block. Others may screw into nut-like elements that are secured to upper surface portions of the bottom of the aluminum frame member.

Other objects, advantages and features of the invention will become apparent from the description of the best mode set forth below, from drawings, from the claims and from the principles that are embodied in the specific structures that are illustrated and described.

BRIEF DESCRIPTION OF THE SEVERAL VIEWS OF THE DRAWING

Like reference numerals are used to designate like parts throughout the several views of the drawing, and:

FIG. 1 is a cross sectional view taken through the kingpin region of an aluminum frame trailer, such view showing a replaceable stainless steel wear plate below a central portion of a kingpin frame assembly that includes an aluminum kingpin mounting block, a replaceable steel kingpin depending from the frame assembly, and studs that connect the kingpin to the block;

FIG. 2 is an enlarged scale view of the central portion of FIG. 1;

FIG. 4 is a cross sectional view taken substantially along lines 4—4 of FIG. 6;

FIG. 5 is a pictorial view of a kingpin frame assembly, taken from above and looking towards the front and one end of the assembly;

FIG. 6 is a top plan view of the kingpin frame assembly shown by FIG. 5, as it appears before a central kingpin opening and two lightening openings are added to the frame members;

FIG. 7 is a top plan view like FIG. 6 but after the lightening openings have been added to the frame structure;

FIG. 8 is a view like FIG. 5 but showing the kingpin and some reinforcement frame members that have been added to the assembly;

FIG. 9 is a cross sectional view taken substantially along line 9—9 of FIG. 8;

FIG. 10 is a cross sectional view taken substantially along line 10—10 of FIG. 8, showing the stainless steel wear plate and hex flange lock nuts exploded away from the frame assembly;

FIG. 11 is a cross sectional view taken substantially along line 11—11 of FIG. 2;

FIG. 12 is a top plan view of the aluminum kingpin mounting block to which the kingpin is connected;

FIG. 13 is an elevational view of the aluminum kingpin mounting block and the kingpin, taken from the aspect of line 13—13 of FIG. 12;

FIG. 14 is a sectional view taken substantially along line 14—14 of FIG. 12;

FIG. 15 is an end view looking towards the right end of FIG. 5, such view showing the kingpin block and the kingpin spaced from their mounted positions on the frame assembly;

FIG. 18 is an end view looking towards the right end of FIG. 5, after the aluminum block and steel kingpin assembly have been installed, such view showing a short cross member spaced above its location in the frame assembly; and FIG. 19 is a view like FIG. 17, but with the cross member installed.

DETAILED DESCRIPTION OF THE INVENTION

Figure 3:
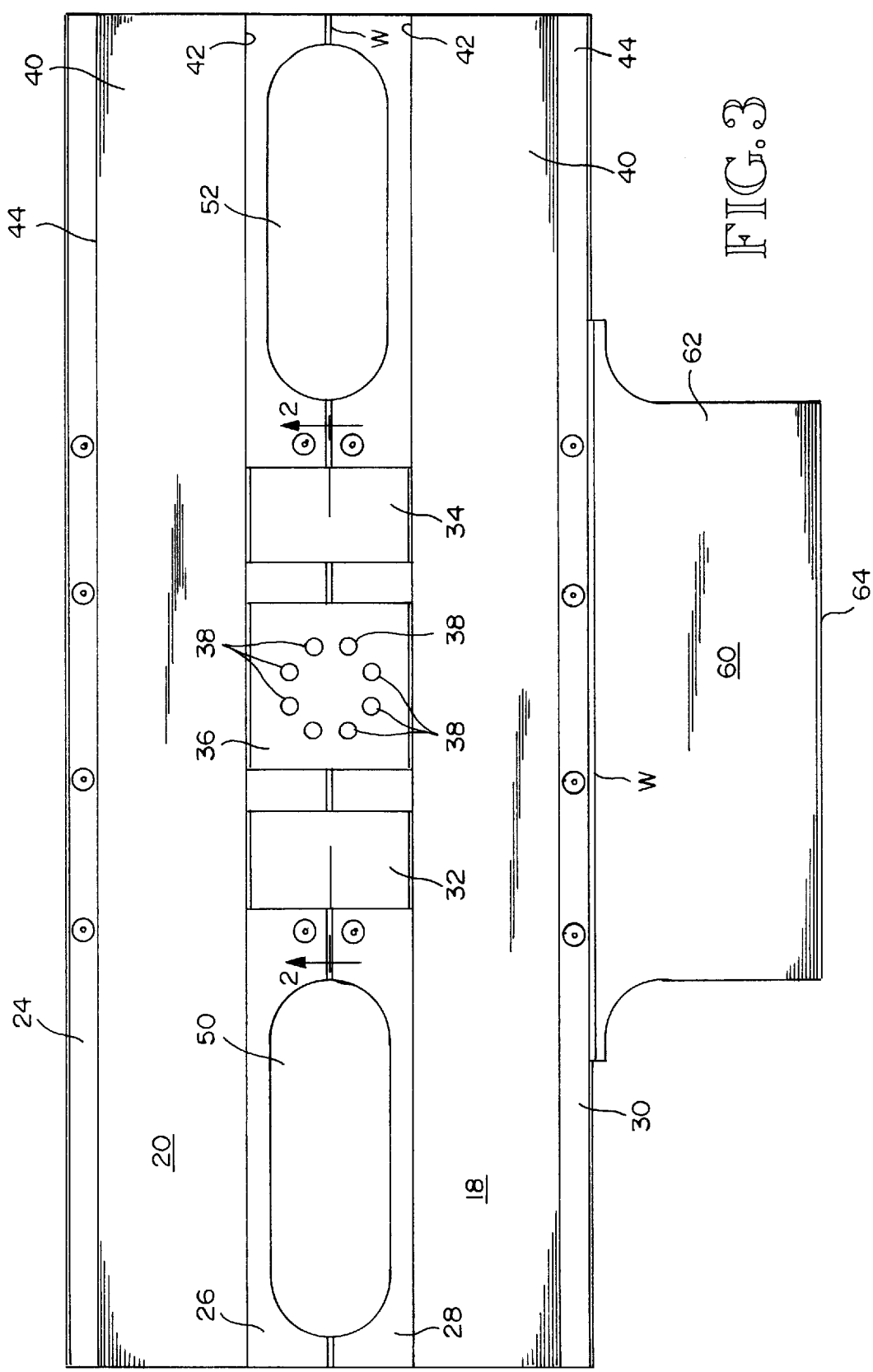
FIG. 3 is a top plan view of the assembly of FIG. 1, but with the sidewalls of the trailer omitted.

FIG. 1 is a transverse sectional view taken through a trailer box 10 in a kingpin region of the trailer. The trailer box 10 includes sidewalls 12, 14 that extend upwardly from opposite ends of an aluminum frame member 16 into which a kingpin KP is mounted.

The aluminum frame member 16 includes a pair of aluminum, longitudinally spaced apart, transverse box beams 18, 20 that project upwardly from bottom flange portions 24, 26, 28, 30 of member 16. A pair of short, aluminum, longitudinal frame beams 32, 34 extend between, and at their ends are welded to, the transverse box beams 18, 20. An aluminum kingpin mounting block 36 is positioned between the longitudinal beams 32, 34 and between the box beams 18, 20. Block 36 is connected to bottom portions 26, 28 of member 16 by a circular array of nut and bolt fasteners 38. Bottom flange portions 24, 30 are narrow flanges and bottom portions 26, 28 are wider flanges.

In preferred form, transverse box beam 20 and flanges 24, 26 are a single member and transverse box beam 18 and flanges 28, 30 are a second member. Each box beam 18, 20 is composed of a top wall 40, a pair of sidewalls 42, 44, a center wall 46 and a bottom wall 47 that includes the flanges 28, 30. FIG. 4 shows that flanges 24, 26 and box beam 20 are a first extrusion and flanges 28, 30 and transverse box beam 18 are an identical second extrusion. As shown by FIGS. 5–8, box beam 20 and its flanges 24, 26 are turned end-for-end relative to box beam 18 and its flanges 28, 30. This orientation places the wider flanges 18, 20 together and places narrow flanges 30 at the front and narrow flange 24 rear of the frame member 16. The flanges 26, 28 are welded together where they meet by a transverse weld bead W.

A first opening 48 is provided at the transverse center of the bottom structure formed by flanges 26, 28. A pair of larger openings 50, 52 are formed in the bottom structure 26, 28 between the center opening 48 and the opposite ends of the frame member. Openings 50, 52 serve to lighten the frame member without adversely affecting its strength. They also act as drain openings so that water and other material can escape from above the king pin assembly.

A formed front plate 60 is positioned forwardly of the center part of flange 30. Plate 60 has a horizontal bottom wall 62 and a vertical front end wall 64. The purpose of the wall 64 on the front plate 60 is to provide a front connector for connecting the plate 60 to the front end 66 of the trailer box 10 (FIG. 10). As shown by FIG. 4, the front and rear edges of flanges 26, 28 and 24, 30 are beveled where they meet. The rear edge of member 62 and the front edge of flange 30 are beveled in the same way. These beveled edges are important for welding purposes. When the extrusions are placed together, the beveled edges create cavities for receiving weld beads. This provides a deep penetrating weld. Member 62 is connected to flange 30 by one continuous weld. Flanges 26, 28 are connected together by one continuous weld W. These transverse welds W are placed in low stress regions away from the extruded box beams 18, 20 that absorb a substantial amount of the stresses coming into the frame member 16 via the kingpin KP.

Each box beam extrusion has a top panel 40, a bottom panel 47, and three webs 42, 44, 46. The use of three webs 42, 44, 46 help to ensure that the bottom wall 47 remains consistently flat during extruding operations. It is very important to maintain a continuously flat surface on the bottom 47 because the bottom 47 constitutes what is known as the coupler plate. The use of the two box beam extrusions provides a structure that is without welds except where the two extrusions are welded together. Eliminating welds reduces the amount of heat placed upon the kingpin assembly during the overall construction of the assembly. It is common knowledge that when tempered aluminum is welded, the heat affected zone can lose some of its strength properties. Therefore, eliminating welds results in a more solid and sound structure. As previously stated, the welds W that are used are placed in low stress areas.

Figures 16, 17:
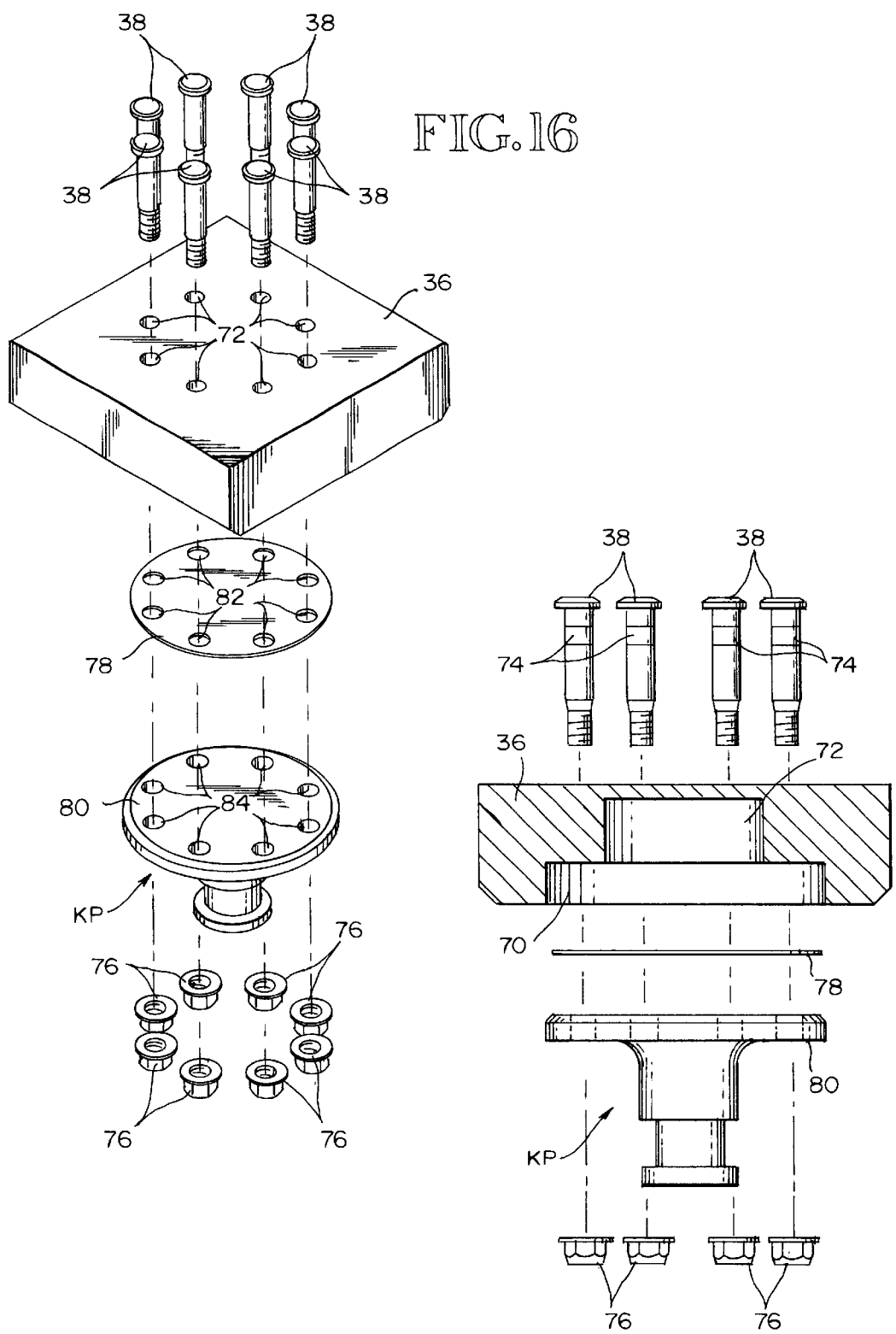
FIG. 16 is an exploded pictorial view of the steel kingpin, the aluminum kingpin mounting block, a stainless steel insert between the aluminum kingpin mounting block and the steel kingpin, eight studs and eight hex flange lock nuts.
FIG. 17 is an exploded elevational view of the components shown by FIG. 15.

The aluminum kingpin mounting block 36 is an extruded block of aluminum that is machined to precision for accurately connecting the steel kingpin KP to the aluminum frame member formed by the two box beam extrusions. As best shown by FIG. 17, the block 36 is formed to include a kingpin receiving socket 70 and an inner void creating socket 72 which functions to make the block 36 lighter. A plurality (e.g. eight) vertical openings 72 are drilled and reamed to receive fastener members (e.g. studs) 38 which are pressed into the openings 72. Preferably, the studs 38 have serrations 74 located below their heads which serve to prevent the studs 38 from turning in the openings 72 when nut elements (e.g. hex flange lock nuts) 76 are being installed or removed.

Preferably, after the studs 38 are pressed into the openings 72, a stainless steel insert 78 is inserted into the socket 70. This insert 78 acts as a barrier between the aluminum block 36 and the steel kingpin KP so as to help prevent corrosion because of contact of two dissimilar metals (steel and aluminum). After stainless steel insert 78 is placed into the socket 70, the disc-shaped head 80 of the kingpin KP is inserted into the socket 70 below insert 78. As shown by FIG. 16, insert 78 and the kingpin head 80 include openings 82, 84 which are positioned to receive and pass the shank portions of the studs 38. When the head 80 of the kingpin KP is within the socket 70, and the lower ends of the studs 38 projects first through openings 82 and then through openings 84, the nuts 76 are installed. Nuts 76 are first hand tightened and then are hand torqued to a desired value (e.g. 300 foot pounds). The torquing sequence for an eight-hole pattern is used to assure that the kingpin KP is properly secured to the mounting block 36.

Referring to FIG. 15, the kingpin assembly (block 36) and kingpin KP is placed between the extruded box beams 18, 20 and the kingpin KP is inserted downwardly through the center opening 48. The mounting block 36 is welded front and rear to the box beam walls 42 and at its lower sides to the flanges 26, 28. The portion of the mounting block 36 that borders the circular edge of the opening 48 is also welded to the flanges 26, 28 at the periphery of opening 48 (FIG. 9).

The longitudinal channels 32, 34 are then positioned on the opposite sides of the kingpin mounting block 36 and at their end edges and at their lower side edges are welded to the box beam walls 42 and the flanges 26, 28, respectively. These channels 32, 36 connect the two transverse box beams 18, 20 together to create a rigid structure that surrounds the kingpin region and extends laterally outwardly from it on each side of the kingpin KP.

The rearward transverse box beam 20 will deflect more under load than the forward transverse box beam 18 because it is only connected to the sidewalls 12, 14 of the trailer box 10. The forward transverse box beam 10 is connected at its ends to the sidewalls 12, 14 and is also connected to the front wall 66 by way of the forward panel 60. As a result, the forward box beam 18 experiences less deflection under load. The connection of the rearward box beam 20 to the forward box beam 18 helps reduce fatigue stresses in the rearward box beam 20. The reinforcing channels 32, 34 help support the overall coupler assembly while it is attached to the fifth wheel on the transport truck. Channels 32, 34 are located near the outer edges of the fifth wheel on the truck. This reduces possible dishing in this area due to side load stresses applied to the coupler assembly via the fifth wheel on the transport truck.

In a typical installation, the aluminum kingpin mounting block 36, may measure about twelve inches long by about twelve inches wide by 3.5 inches high and may be made of a type 6061-T6 aluminum. The box beam extrusions may also be made of type 6061-T6 aluminum. Longitudinal changes 32, 34 may be made from type 5083-H32 aluminum extrusions.

Referring to FIGS. 10 and 11, a replaceable stainless steel wear plate 84 is preferably provided below at least the central region of the kingpin assembly. Stainless steel has very good wear properties and is also quite compatible with aluminum alloys. It is very advantageous to incorporate this wear plate 84 into the assembly. If the aluminum material 24, 26, 28, 30, 47 was allowed to ride directly on the fifth wheel of the transport truck, the aluminum material would not be able to withstand the wear placed upon it for any substantial length of time. The stainless steel wear plate 84 provides wearablility and also provides a smooth surface for the fifth wheel on the transport truck to rest upon.

The stainless steel wear plate 84 may be connected to the aluminum members by use of aluminum plugs 86 and stainless steel countersunk socket head cap screws 88. Predrilled openings, (e.g. ⅜ in. diameter) are formed in the stainless steel wear plate 84. These holes are lined up with similar holes (pre-drilled ⅜ in. diameter) in the bottom flanges 24, 26, 28, 30 of the box beam extrusions. The cap screws (e.g. ⅜ in. stainless steel screws) are inserted upwardly, first through the openings in the wear plate 84 and then into drilled and tapped openings in the members 86. The cap screws 88 are torqued and then the members 86 are welded to the aluminum flanges 24, 26, 28, 30. The use of the cap screw connections causes the lower surface of the stainless steel wear plate 84 to remain substantially flat and smooth where it contacts the fifth wheel located on the transport truck. The cap screw connection also permits the stainless steel wear plate 84 to be removed and replaced after it has worn an amount sufficient to justify replacement. The kingpin mount provided by the studs 38 and the nuts 76 also permit the kingpin KP to be removed and replaced when it has worn an amount sufficient to justify its replacement with the new kingpin KP.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather are to be determined by the following claims, interpreted according to accepted doctrines of patent claim interpretation, including use of the doctrine of equivalents and reversal of parts.

What is claimed is:

1. A kingpin assembly for an aluminum frame trailer, comprising:

an aluminum frame member including a bottom and a kingpin receiving opening in said bottom;

an aluminum kingpin mounting block including a downwardly opening socket surrounded by a base;

a steel kingpin having a kingpin head within said socket and a kingpin shaft depending from said kingpin head;

a plurality of fasteners detachably connecting the kingpin head to the aluminum mounting block;

said kingpin shaft extending downwardly from the kingpin head through the kingpin opening in the bottom of the aluminum frame member, and projecting downwardly from and below the aluminum frame member;

said aluminum kingpin mounting block being welded to the aluminum frame member, for securing the aluminum mounting block and the steel kingpin to the aluminum frame member;

wherein said aluminum frame member comprises a pair of longitudinally spaced apart transverse box beams that extend upwardly from the bottom of the aluminum frame member, wherein the kingpin opening in the bottom of the aluminum frame member is between the transverse box beams, wherein the aluminum mounting block is welded to the transverse box beams;

wherein the aluminum frame member comprises two extrusions welded together to form the aluminum frame member;

wherein each extrusion comprises a portion of the bottom of the aluminum frame member and a different one of the transverse box beams; and wherein the portions of extrusion which provide the bottom of the aluminum frame member are welded together between the transverse box beams.

2. The kingpin assembly of claim 1, wherein each box beam is composed of at least three, spaced apart, vertical webs with lower edges that are attached to the bottom of the aluminum frame member and upper edges, and a top web that is connected to and interconnects the top edges of the vertical webs.

3. The kingpin assembly of claim 1, comprising a pair of aluminum, longitudinal frame beams, interconnected between the two transverse box beams, on opposite sides of the aluminum kingpin mounting block, said longitudinal frame beams being connected to the bottom of the aluminum frame member and having ends that are welded to the transverse box beams.

4. The kingpin assembly of claim 1, wherein the aluminum kingpin mounting block and the kingpin head include complementary, circular arrays of fastener openings and said fasteners extend through said openings.

5. The kingpin assembly of claim 1, wherein the fasteners are studs that are press fit into the openings in the aluminum kingpin mounting block, said studs having threaded lower end portions that project downwardly from the aluminum kingpin mounting block and through openings in the kingpin head, and said fasteners further include nuts that are threaded onto the threaded lower ends of the studs.

6. The kingpin assembly of claim 5, wherein the nuts are hex flanged lock nuts.

7. The kingpin assembly of claim 1, further comprising a stainless steel plate between the aluminum kingpin mounting block and the head of the steel kingpin.

8. The kingpin assembly of claim 2, further comprising a stainless steel plate between the aluminum kingpin mounting block and then head of the steel kingpin.

9. The kingpin assembly of claim 5, further comprising a stainless steel plate between the aluminum kingpin mounting block and the head of the steel kingpin, said plate including openings through which the studs extend before they extend through the openings in the kingpin head.

10. The kingpin assembly of claim 9, wherein the nuts are hex flanged lock nuts.

11. The kingpin assembly of claim 1, further comprising a replaceable stainless steel wear plate below the bottom of the aluminum frame member.

12. The kingpin assembly of claim 11, comprising screw fastener receiving sockets on said aluminum frame member and screw fasteners extending upwardly through a stainless steel wear plate and screw into the screw fastener sockets, for securing the stainless steel wear plate to the aluminum frame member.

13. The kingpin assembly of claim 12, comprising screw fasteners connecting the stainless steel wear plate to the aluminum frame member.

14. The kingpin assembly of claim 11, comprising screw fasteners extending upwardly through the stainless steel wear plate and screwing into the aluminum mounting block, for connecting the stainless steel wear plate to the aluminum mounting block.

15. A kingpin assembly for an aluminum frame trailer, comprising:

an aluminum frame member comprising an extrusion formed body that includes a bottom plate and longitudinally spaced apart transverse box beams above the bottom plate, said bottom plate including a kingpin receiving opening positioned longitudinally between two transverse beams, an aluminum kingpin mounting block including a downwardly opening socket surrounded by a base;

a steel kingpin having a kingpin head within said socket and a kingpin shaft depending from said kingpin head;

a plurality of fasteners connecting the kingpin head to the aluminum kingpin mounting block;

said kingpin shaft extending downwardly through the kingpin opening in the bottom plate of the aluminum frame member, and projecting downwardly from and below the aluminum frame member;

said aluminum kingpin mounting block being connected to the aluminum frame member, for securing the aluminum kingpin mounting block and the steel kingpin to the aluminum frame member; and a stainless steel wear plate below the bottom plate of the aluminum frame member; and screw fasteners that detachably connect the stainless steel wear plate to the aluminum frame member.

16. The kingpin assembly of claim 15, wherein the aluminum kingpin mounting block is welded to the aluminum frame member.

17. The kingpin assembly of claim 16, wherein the extrusion formed body comprises two extrusions welded together to form the aluminum frame member, wherein each extrusion comprises a portion of the bottom plate of the aluminum frame member and a said transverse box beams, and wherein the portions of the bottom plate of the aluminum frame member are welded together between the transverse box beams.

18. The kingpin assembly of claim 15, further comprising a stainless steel plate between the aluminum kingpin mounting block and the head of the steel kingpin.

19. The kingpin assembly of claim 15, wherein some of the screw fasteners extend through openings in the stainless steel wear plate and screw into the aluminum kingpin mounting block, and some more screw fasteners extend through openings in the stainless steel wear plate and screw into internally threaded members that are secured to the aluminum frame member.

20. The kingpin assembly of claim 19, further comprising a stainless steel plate between the aluminum kingpin mounting block and the head of the steel kingpin.

* * * * *